Figure 1:
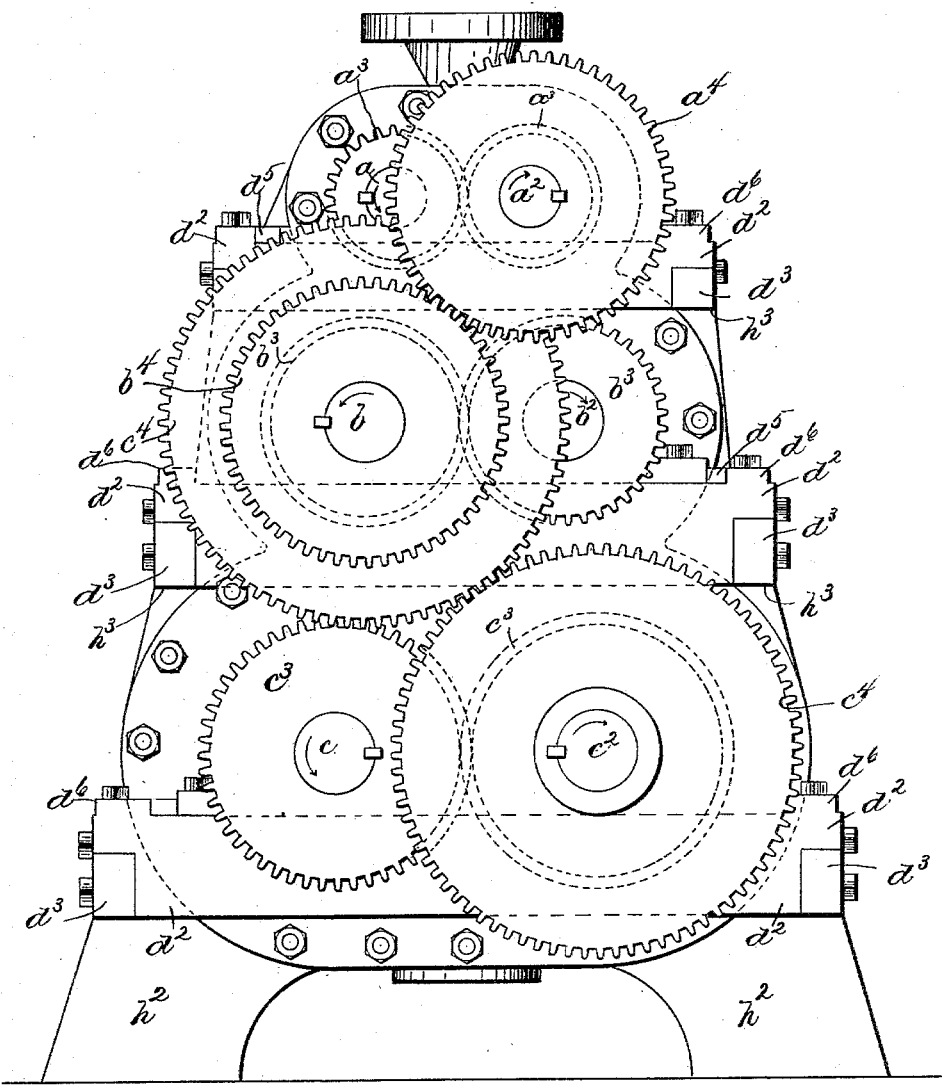

(No Model.) 4 Sheets—Sheet 2.
H. T. MORSE.
ROTARY ENGINE.

No. 562,843. Patented June 30, 1896.

Witnesses
Jas. J. Maloney.
H. P. Livermore.

Inventor.
Henry T. Morse,
by Jo. P. Livermore
Att'y.

(No Model.) 4 Sheets—Sheet 3.
H. T. MORSE.
ROTARY ENGINE.

No. 562,843. Patented June 30, 1896.

Witnesses
Jas. J. Maloney.
H. J. Livermore.

Inventor.
Henry T. Morse,
by Jos. P. Livermore
Att'y.

(No Model.)

4 Sheets—Sheet 4.

H. T. MORSE.
ROTARY ENGINE.

No. 562,843.

Patented June 30, 1896.

Witnesses
Jas. J. Maloney.
J. P. Livermore.

Inventor,
Henry T. Morse.
By Jos. P. Livermore
Att'y.

UNITED STATES PATENT OFFICE.

HENRY T. MORSE, OF BOSTON, MASSACHUSETTS, ASSIGNOR TO THE MORSE ROTARY ENGINE COMPANY, OF SAME PLACE.

ROTARY ENGINE.

SPECIFICATION forming part of Letters Patent No. 562,843, dated June 30, 1896.

Application filed June 25, 1894. Serial No. 515,676. (No model.)

*To all whom it may concern:*

Be it known that I, HENRY T. MORSE, of Boston, county of Suffolk, State of Massachusetts, have invented an Improvement in Rotary Engines, of which the following description, in connection with the accompanying drawings, is a specification, like letters on the drawings representing like parts.

My invention relates to rotary fluid-pressure motors and is embodied in a rotary steam-engine having two or more pairs of parallel cylinders the openings in which intersect or overlap, and a pair or pairs of shafts corresponding to said cylinders, each having a piston-carrier and piston thereon within its cylinder whereby it is actuated, the said shafts being geared together so as to rotate in unison, so that all of the said piston-carriers rotate at an equal angular velocity.

The invention consists mainly in a novel arrangement of the induction and exhaust ports, in combination with the cylinders and pistons thereon, as hereinafter described, and also in certain details of construction which will be hereinafter fully set forth.

With the arrangement of parts embodied in my invention, fluid-pressure, as that of steam, is utilized through the greatest possible length of stroke, while the mechanical arrangement is such as to produce the greatest efficiency and at the same time make the apparatus compact and the parts thereof readily accessible for inspection or repairs.

The engine embodying the invention is a compound engine, two or more pairs of cylinders being arranged, preferably one pair above another and connected by ports through which the steam exhausts from one pair to the next, live steam being admitted to one connected pair of cylinders and acting upon the pistons therein during more than three-quarters of a rotation of the shaft driven thereby, and then being exhausted into the next pair of cylinders, which are of greater diameter than the first pair, and thus contain a proportionately larger steam-space and piston area, so that the steam exhausting from the first pair of cylinders expands in the next pair, thus producing a compound engine; and any desired number of such pairs of cylinders may be used to permit the required amount of expansion of the steam in passing through the series. As herein shown, three such pairs of cylinders are used, thus affording triple expansion of the steam, which is finally exhausted from the last pair. In each pair of cylinders and connected with the main shaft are two hubs or solid piston-carriers of the same length as the cylinders in which they work but of less diameter, being of a diameter equal to the distance between the axes of the shafts, so that the peripheries of the said piston-carriers just touch each other but have a rolling contact upon each other in the rotation of the pistons and shafts. Each single piston-carrier is provided with a piston projecting out from its periphery across the space between the periphery of the piston-carrier and the inner surface of the cylinder, and each piston-carrier has adjacent to the piston thereon a recess which receives the piston on the other piston-carrier as the pistons pass each other in the rotation of the shafts, the said pistons of each pair thus intermeshing like the teeth of a gear. Steam is admitted to the cylinders at one side of the point of contact of the piston-carriers, for example, above, and is exhausted therefrom at the opposite side of the point of contact, that is, below, and the said piston-carriers thus constitute an abutment to confine the steam so that it acts upon the radially-projecting pistons and drives them around in the annular space between the piston-carriers and cylinders, being exhausted when the pistons pass the outlet-port.

The piston-carriers are so arranged that the pistons in each succeeding cylinder of the series pass the induction-port of their own pair of cylinders at substantially the time when the pistons in the preceding cylinder pass their exhaust-port, and after the exhaust-port is thus passed the annular space around the piston-carriers of the preceding pair of cylinders is open from their inlet to their exhaust ports, since there is but one piston on each carrier, and these pistons at that period of the stroke are passing each other at the middle of the cylinders. Thus taking, for example, the first and second pairs of the series, it will be seen that during the first portion of the revolution of the piston-carriers in the second cylinders live steam is admitted directly thereto, after which the pistons in the first cylinders pass their induction-port, acting practically as a cut-off for those in the second cylinders, which are then operated for the remainder of their stroke by the expansion of the live steam already admitted, together with the exhaust from the first cylinder.

By means of a novel arrangement of the induction and exhaust ports the pistons in each pair of cylinders are caused to take steam simultaneously, and the general arrangement of the engine is such that it is practicable to make all the cylinders of a single casting, the induction and exhaust ports consisting of passages in said casting, while the cylinder-heads consist of plates covering the ends of the cylinders, thus greatly simplifying the construction of the engine and reducing the expense of construction.

That portion of the invention which consists in the arrangement of the port-openings relative to the pistons and in the details of construction of the piston-packing and means for seating the ends of the piston-carriers upon the cylinder-heads, so as to form a practically steam-tight joint without undue friction, may be embodied in an engine having only a single pair of cylinders and pistons adapted to operate properly therein.

Figure 2:
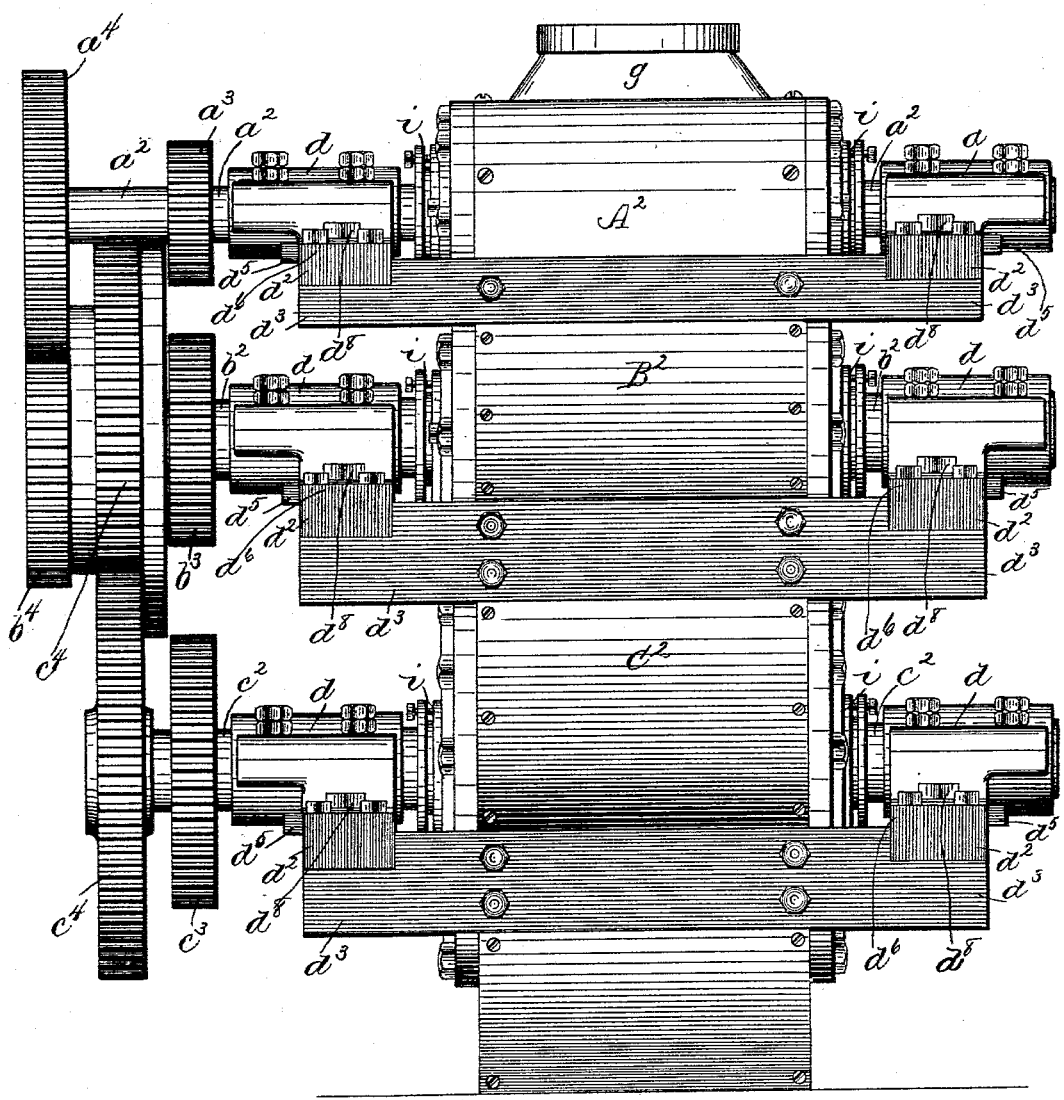
Figure 3:
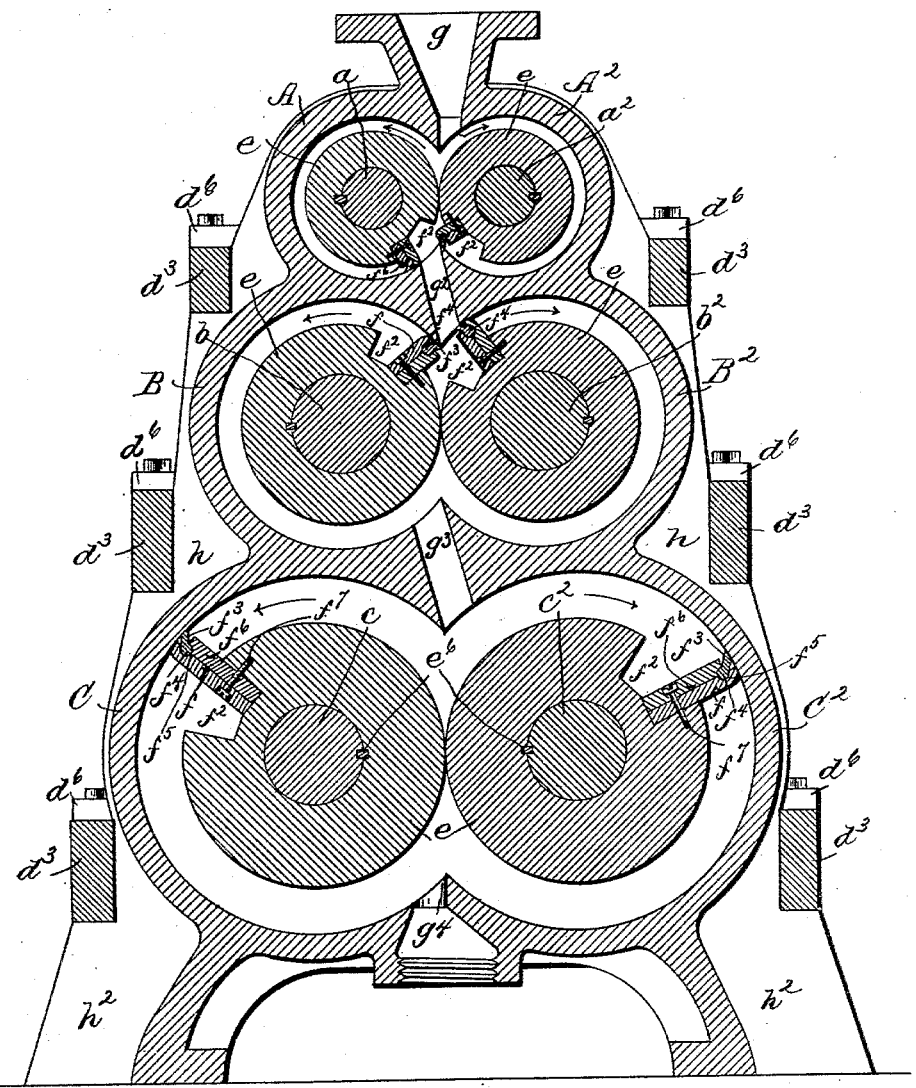
Figure 4:
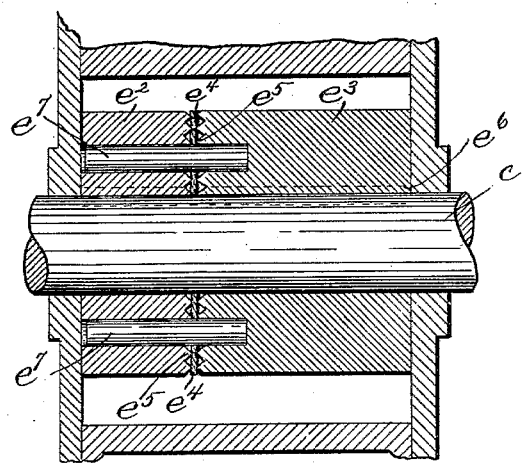
Figure 5:
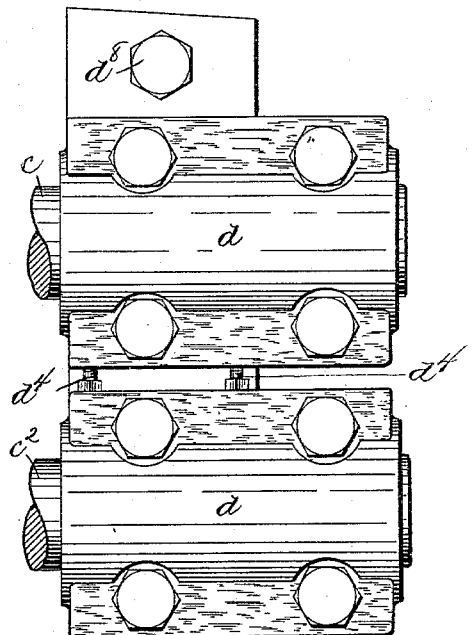

Figure 1 is an end elevation of a rotary engine embodying this invention. Fig. 2 is a side elevation thereof. Fig. 3 is a vertical section through the center of the engine, showing the arrangement of the cylinders, ports, and pistons. Fig. 4 is a longitudinal section of one of the shafts and piston-carriers, showing the means whereby the ends of the said piston-carriers are held in contact with the cylinder-heads; and Fig. 5 is a detail in plan showing the means for supporting and adjusting the shaft-bearings.

The engine comprises a series of pairs of cylinders $A$ $A^2$ $B$ $B^2$ $C$ $C^2$, herein shown as three in number, the bores or spaces of the two cylinders of each pair overlapping or intersecting, as best shown in Fig. 3. Passing longitudinally through the said pairs of cylinders are pairs of shafts $a$ $a^2$ $b$ $b^2$, and $c$ $c^2$, the said shafts being concentric with their respective cylinders and extending through the heads thereof, the ends of the said shafts being mounted in suitable bearings $d$ outside of the cylinders. Each pair of shafts is geared together by means of gear-wheels $a^3$, $b^3$, and $c^3$, respectively, while the upper right-hand shaft $a^2$ is geared to the middle left-hand shaft $b$ by means of a gear $a^4$ on the shaft $a^2$ and the gear $b^4$ on the shaft $b$. The lower right-hand shaft $c^2$ is also geared to the shaft $b$ by means of the gear-wheels $c^4$, so that all of the said shafts rotate simultaneously and at equal angular speed, while power may be taken from any of them as desired, preferably from the shaft $b$. The gears are all shown in Fig. 1 at one end of the machine, but it is obvious that part of them may be placed at the opposite end, if desired, such an arrangement being preferable in practice. Each shaft has keyed upon it a cylindrical piston-carrier $e$ equal in length to the length of the cylinder in which it works, but of less diameter than the bore of the said cylinder, as shown in Fig. 3, so as to leave an annular space between the piston-carrier and the inner surface of the cylinder, the diameters of said piston-carriers being equal to the distance between the axes of their respective shafts, so that the peripheries of each pair of piston-carriers just touch with a rolling contact as the shafts rotate in the direction of the arrows.

The pairs of cylinders $A$ $A^2$, $B$ $B^2$, and $C$ $C^2$, as herein shown, are of gradually-increasing diameter, the cylinders $A$ $A^2$ being the smallest and the cylinders $C$ $C^2$ being the largest, while the cylinders $B$ $B^2$ are intermediate, so that the steam-space in each succeeding cylinder of the series is larger than in the preceding one, and the pressure acts at a greater radial diameter from the axis of the shaft, so that the effective forward pressure due to the expansion of the steam exhausting from the smaller to the larger cylinder exceeds the back pressure thereof, as is necessary to obtain advantage from compounding. It is preferable, however, to also increase the piston area in each succeeding cylinder, and to accomplish this end the piston-carriers in the larger cylinders are, as shown, of such size that the width of the annular space between their peripheries and the inner walls of the cylinders is greater than the width of the corresponding space in the smaller cylinders, the radial length of the pistons being greater and the piston area consequently larger. Thus the steam passing through the series will work expansively, as is usual in compound engines. The piston-carriers $e$ are provided, respectively, each with a single piston $f$, shown as a plate secured in a recess $f^2$ in the periphery of the piston-carrier and extending radially outward therefrom across the annular space between the periphery thereof and the bore of the cylinder, said pistons also preferably increasing in size in the consecutive pairs of cylinders, as shown and above mentioned, in proportion to the diameters of the piston-carriers and cylinders, so that the proper increase of piston area is afforded for successive expansions.

The recesses $f^2$ are arranged to register with one another in the rotation of the piston-carriers with the connected shafts, and the said recesses are wider than the thickness of the piston-blades, one of which is set at the forward side of the recess in its piston-carrier, while the other is set at the rear side of the recess in its carrier, using the terms "forward" and "rear" in relation to the direction of rotary movement of the periphery of the piston-carrier. Thus the recess $f^2$ of each piston-carrier is in proper position to receive the projecting portion of the piston of the other carrier as the pistons pass through the place where the piston-carriers adjoin one another in the rotation of the said piston-carriers.

Steam is admitted to the first or high-pressure cylinders A A² through an inlet-port $g$, Fig. 3, arranged to be connected with the steam-supply pipe, the said port opening through the side of the cylinder A² at a point above the meeting-line of the piston-carriers $e$ and adjacent to the point of intersection between the two cylinders. The intermeshing pistons are so arranged that that on the right-hand piston-carrier travels in advance of that on the left-hand piston-carrier, the recess in the right-hand piston-carrier being behind the piston, while that in the left-hand piston-carrier is in front of the piston thereon. If, therefore, the induction-port opened directly at the point of intersection with the cylinders, the right-hand piston would pass the mouth of the said port before the left-hand piston has reached it, thus causing back pressure upon the said left-hand piston. By the arrangement herein shown, however, as indicated in Fig. 3, the left-hand piston reaches the left-hand edge of the induction-port at the same time that the right-hand piston reaches the right-hand edge thereof, so that the steam thus entering passes into the annular space between the piston-carrier and cylinder and bears simultaneously upon the radially-projecting pistons $f$ and tends to force them around in the said space and produce rotation of the shafts and piston-carriers in the direction of the arrows shown in Fig. 3, the piston-carriers themselves, by their engagement with one another on a line adjoining the axes of the shafts, constituting an abutment which confines the steam, so that it presses effectively on the pistons.

The outlet-port from the first pair of cylinders is below the meeting-line of the piston-carriers therein and is shown as a passage $g^2$ in the main casting leading from the cylinder A to the cylinder B², the inlet-opening of said passage (i. e., the exhaust-port opening for the cylinders A A²) being in the lower right-hand portion of the cylinder A diagonally opposite the mouth of the main induction-port $g$ and adjacent to the point of intersection of the two cylinders. The exhaust-opening of said cylinders thus bears the same relation to the pistons therein as that of the main induction-port above described, so that the said cylinders pass the edges of the opening of said port simultaneously after being acted upon by the steam for somewhat more than three-fourths of a revolution. The said passage extends from the cylinder A diagonally downward into the cylinder B², which it enters at a point corresponding to the opening of the main induction-port $g$ in the cylinder A², so that the pistons in the cylinders B B² are simultaneously acted upon in the same manner as those in the cylinders A A².

When, therefore, the pistons $f$ in the cylinders A A² pass the point at which they are shown in Fig. 3, the connecting-passage $g^2$ is in open communication with the annular space in said cylinders, so that the steam can exhaust through said passage into the second pair of cylinders, in which the pistons are so located as to be adjacent to the mouth of said passage $g^2$, (which constitutes the inlet-port for the second pair B B² of cylinders,) as shown in Fig. 3, and ready to be acted upon simultaneously by the steam entering through said passage from the cylinders A A². Thus at the time when the pistons $f$ in the first pair of cylinders pass the exhaust-port thereof and permit the steam to exhaust from the first into the second pair of cylinders, the pistons in the second pair are substantially at the beginning of their annular stroke through the second pair of cylinders and are thus effectively acted upon by the steam entering from the first pair, and as soon as the shaft is advanced somewhat less than a quarter-turn from the position shown in Fig. 3 the pistons in the first pair of cylinders again receive the direct pressure from the steam entering the said cylinders, or are at the beginning of their stroke with relation thereto, and are thus carried around by the live steam entering while the steam in advance of them is being exhausted into the second pair of cylinders, and acting on the pistons therein to do effective work from its expansion from the volume occupied in the first to that occupied in the second pair of cylinders, as its forward or driving pressure in the second pair acts upon a larger piston area than its back pressure in the first pair. By this arrangement, moreover, the passages between successive pairs of cylinders are direct and short, thereby affording a minimum of clearance. It is to be noted, however, that the expansion may also be effectually used without substantially increasing the piston area in the successive cylinders, when the said cylinders are of larger diameter than those preceding them in the series, since, as hereinbefore mentioned, the point at which the pressure is exerted is at greater radial distance from the shaft in the larger than in the smaller cylinders, so that the forward pressure acts with greater advantage in leverage than the back pressure.

When three or more pairs of cylinders are used, as shown, the exhaust from the second is through a port $g^3$, connecting said cylinders and standing in the same relation to the second and third pair of cylinders that the port $g^2$ does to the first and second, and the pistons in the third pair of cylinders are in the same relation to the pistons in the second pair that the latter are to the pistons in the first pair, that is, a portion of a revolution in advance, substantially equal to what is required to carry the pistons from the exhaust to the inlet ports of the cylinders corresponding thereto. It will be seen that there is a short interval of time in which the pistons in the first pair of cylinders are passing from the exhaust-port to the position at which they again pass the inlet-port opening into said cylinders, in which interval of time live steam will pass directly around through the first pair of cylinders and into the second pair, but as soon as the pistons in the first pair of cylinders pass the inlet-port thereof they cut off further admission of live steam to the second pair of cylinders, the pistons in which are then operated solely by expansion of the live steam previously admitted thereto and the exhaust from the first cylinder. The arrangement is such, moreover, that when the pistons of the first cylinder are passing each other, or, in other words, are at that portion of the stroke during which they are not acted upon by the steam-pressure, the pistons in the second pair of cylinders are exposed to direct steam-pressure from the boilers, while those in the third are also in a position to be operated upon by expansion. Similarly, when the pistons in either of the other pairs of cylinders are passing their neutral or inoperative position, the remaining pairs are performing effective work. Thus taking the engine as a whole, there is practically no dead-point, so that the usual fly-wheel may be dispensed with, and this fact, taken in connection with the general structure of the engine, makes it especially adapted for direct connection with the load, this being a desirable feature when the engine is to be utilized for driving a dynamo, the armature of which may be coupled to whichever shaft of the engine is to be used as the driving-shaft. The steam is exhausted from the last pair of the series of cylinders through an exhaust-port $g^4$, shown as formed in the lower side of the cylinder C, in a position corresponding to that of the exhaust-ports of the other cylinders. In this manner the steam may be used expansively to any extent that is desirable, and finally exhausted into the air or into a condenser, as is usual in steam-engines.

The pistons $f$ are provided with packing-blades $f^3$, having a cylindrical shank $f^4$, which enters a corresponding bore or socket in the piston, so that the said packing-blade has a pivotal or swiveling connection with the piston and may be forced by the steam-pressure against the surface of the bore of the cylinder. The bearing-socket in the piston extends more than half-way around the cylindrical shank of the packing-blade, so that the latter while having a free pivotal movement through a sufficient angle cannot be thrown radially from the piston while passing through the space where the bore of the cylinder is interrupted. The said bearing-socket consists of a recess $f^5$ at the back of the piston $f$ and near the outer end thereof, which extends to the surface of the cylinder, but is not closely in contact therewith, so as to produce undue friction. The shank $f^4$ is retained in the said recess by a supplemental block or portion $f^6$, having at its outer end a recess portion registering with the recess $f^5$, thus forming a socket extending more than half around the shank, as above described. The piston $f$ and the supplemental portion $f^6$ are secured to each other and to the piston-carrier by means of screws $f^7$ or equivalent fastening devices. Since the piston $f$ is in front of the packing-blade, as the shaft rotates it is obvious that the said packing-blade cannot be turned in its socket beyond a perpendicular position with relation to the axis of the shaft and is firmly seated by the pressure of the steam against the inner surface of the cylinder, thus forming a steam-tight joint. On the other hand, should the pressure in front of the piston exceed that behind it, as might be the case in a double or triple expansion engine when working under less than its full load of steam, so that the atmospheric pressure exceeds that of the steam when at its maximum expansion, it is obvious that the packing-blade may become unseated, since the supplemental portion does not extend beyond the axis of the shaft $f^4$. The engine can therefore be used to advantage with less than its maximum load, since the back pressure or false load caused by the expansion of steam to a point at which its pressure is less than that of the atmospheric pressure is thus avoided, the fit of the piston-carrier being sufficiently loose or inexact to allow air to pass between it and the bore of the cylinder, unseating the packing and bringing to a balance the pressure on opposite sides of the piston. It is also necessary to have a substantially steam-tight joint between the ends of the piston-carriers and the inner surfaces of the cylinder-heads. In order to accomplish this without producing undue friction as the piston-carriers rotate and at the same time to allow for any inequalities of expansion of the said parts when heated, the piston-carrier is divided into two parts $e^2$ and $e^3$, Fig. 4, the outer ends of said parts being seated against the inner surfaces of the cylinder-heads, while the inner ends thereof are adjacent to each other, but separated by an annular disk $e^4$ of yielding material, preferably asbestos. In the said inner surface are cut annular grooves, thus making a series of V-shaped projections $e^5$, the apexes of which are opposed to each other, but separated by the yielding disk $e^4$, which forms a steam-tight joint. The two portions $e^2$ $e^3$ are thus held firmly in contact with the cylinder-head, while the disk of yielding material allows them to come together somewhat under pressure caused by variation in expansion or otherwise, so that it is impossible for the piston-carriers to bind between the cylinder-heads. The said piston-carriers are secured to the shaft by means of a spline or splines $e^6$ (shown in dotted lines, Fig. 4) and are secured to each other by means of dowel-pins $e^7$, which may be fast in one of the parts, but capable of moving longitudinally in the other, so as to allow the relative movement thereof. The pistons themselves may be connected together by a sliding connection, such as a spline, or, if desired, the disk $e^4$ may be large enough in diameter to extend outward between the pistons on the respective sections of the piston-carriers, so as to close the space between the said pistons substantially as the space is closed between the sections of the piston-carrier. The packing-blade $f^3$ $f^4$ is preferably made continuous, since it is in itself flexible and therefore will not tend to bind in the cylinder.

The engine is preferably constructed and arranged as best shown in Figs. 1 and 2, and is composed, mainly, of a single casting $h$, provided with a base portion or standards $h^2$, and contains the cylinders A A$^2$, &c., arranged in pairs, said cylinders being parallel and preferably one above the other. The shaft-bearings $d$ are supported upon cross-bars $d^2$, resting on longitudinal bars $d^3$, which are supported on shoulders $h^3$ at the sides of the main casting. The bearings are provided at the inner sides with bolts or screws $d^4$, Fig. 5, screwed into one of the bearings and extending outward therefrom into contact with the adjacent bearing. The said bearings are thus capable of lateral adjustment by means of the screws which determine their distance from each other, and after they are in proper position they are held in place by means of wedges $d^5$, driven in between the outer sides of the bearings and projections or lugs $d^6$ upon the cross-bars $d^2$, the said lugs being integral therewith, as shown, or secured thereto by any other suitable means. After the bearings are in proper position they are finally secured by means of cap-screws $d^8$, screwed into the cross-pieces $d^2$. At the outer ends of the cylinders are stuffing-boxes $i$, affording a steam-tight fit for the shafts.

Engines constructed as hereinbefore described are inexpensive, efficient, and durable, while the parts thereof are few in number and readily accessible. As the piston-carriers engage each other with a rolling contact only at their peripheries they are not subjected to wear, but at the same time will insure a substantially steam-tight contact, while the direction of their rotation is such as to tend to throw steam on the inlet side away from said contact, so that a very effective abutment is produced by this construction. The ends of the said piston-carriers, moreover, being provided with the yielding packing connection, which forms a part of this invention, are also subjected to but slight wear, and at the same time form with the cylinder-heads tight joints through which substantially no steam can escape. This feature, in connection with the novel packing device for the pistons themselves, and also the arrangement of the induction and exhaust ports, results in a very economical production of power not heretofore obtained with any rotary engine known in the art.

I claim—

1. The combination with two or more pairs of cylinders the openings or bores of each pair of which intersect or overlap, of a pair of cylindrical piston-carriers for one pair of cylinders, said piston-carriers being of a diameter equal to the distance between their axes and each having a single piston and a recess adjacent thereto; a similar pair of piston-carriers and pistons in each succeeding pair of cylinders set with the pistons in position to pass the corresponding inlet-port substantially as those in the preceding pair pass the exhaust-port corresponding thereto; a connection between the several piston-carriers whereby they rotate in unison and maintain the relation above set forth; a connecting-passage between a given pair of cylinders and the next, whereby steam is exhausted from the former to the latter; and an induction-port for the first pair of cylinders and an exhaust-port for the last pair of cylinders, substantially as described.

2. A rotary fluid-pressure engine comprising two or more pairs of intersecting or overlapping cylinders arranged parallel with one another, the said pairs of cylinders increasing in diameter from one to another of the series; a pair of shafts in the first pair of cylinders having piston-carriers consisting of cylindrical hubs each having a single piston extending radially from the outer surface thereof to the inner surface of the cylinder, and a recess adjacent to said piston; a similar pair of piston-carriers and pistons in each succeeding pair of cylinders set with the pistons a portion of a revolution in advance of those in the preceding pair, substantially that required to carry any given pair of pistons from the exhaust to the inlet port of the pair of cylinders in which they operate; a connection between the several piston-carriers whereby they rotate in unison and maintain the relation above set forth, and passages extending from one cylinder of each pair to the opposite cylinder of the adjacent pair, and opening in each cylinder at a point adjacent to the point of intersection of the pair of cylinders; said passages constituting exhaust-ports for the cylinders of smaller diameter and inlet-ports for the cylinders of larger diameter, substantially as described.

3. The combination of a pair of cylinders having a corresponding pair of shafts and piston-carriers on the said shafts; with pistons on the said carriers extending radially outward therefrom; sockets at the outer end of the said pistons; packing-blades having cylindrical shanks contained in said sockets, more than one-half the said shanks being embraced thereby, and the front walls of said sockets being higher than the rear walls thereof, as and for the purpose described.

4. The combination of a pair of cylinders having a corresponding pair of shafts and piston-carriers on the said shafts; with pistons on said carriers, and packing blades or extensions near the extremity of the said pistons, the said packing-blades having cylindrical shanks working in sockets formed in the rear portion of said pistons and embracing more than one-half the said shanks, whereby the said blades are connected with the pistons and capable of pivotal movement with relation thereto, substantially as described.

5. A rotary fluid-pressure engine consisting of a series of pairs of intersecting or overlapping cylinders all formed integral and arranged parallel one pair above another, the heads of said cylinders consisting of plates adapted to cover the ends of all of the said cylinders, and ports or passages extending diagonally from the lower side of one cylinder adjacent to the line of intersection with its mate to the upper side of the opposite cylinder of the next pair; in combination with a pair of shafts in one pair of cylinders having piston-carriers thereon of a diameter equal to the distance between the axes of said shafts and a single radial piston for each carrier extending from the surface thereof to the inner wall of the cylinder, and a recess in each carrier adjacent to the said piston; a similar pair of piston-carriers and pistons in each succeeding pair of cylinders set with the pistons a portion of a revolution in advance of those in the preceding pair, substantially that required to carry the pistons of any given pair of cylinders from the exhaust to the inlet port thereof, and a connection between the several shafts whereby the piston-carriers rotate in unison and the relation above set forth is maintained, substantially as described.

6. The combination with a rotary fluid-pressure engine comprising a series of pairs of cylinders arranged one above another and plates adapted to close the ends of said cylinders, of supports for the shaft-bearings mounted on shoulders formed in the said plates; adjustable separators interposed between the bearings for each pair of shafts and wedges adapted to secure the bearings in position when properly adjusted by said separators, substantially as described.

7. In a rotary fluid-pressure engine consisting of a pair or pairs of overlapping intersecting cylinders and shafts extending longitudinally through the said cylinders and adapted to rotate therein, the herein-described piston-carriers consisting of two or more cylindrical hubs or blocks mounted on the said shafts and connected thereto so as to rotate therewith but free to move longitudinally thereon, annular V-shaped grooves in the adjacent ends of the said hubs respectively, and disks of yielding material such as asbestos between the said hubs and engaged by the portions thereof between the said grooves whereby the said hubs are separated and the outer ends thereof held in yielding engagement with the inner surface of the cylinder-heads, as described.

In testimony whereof I have signed my name to this specification in the presence of two subscribing witnesses.

HENRY T. MORSE.

Witnesses:
H. J. LIVERMORE,
M. E. HILL.